(12) United States Patent
Wang

(10) Patent No.: US 9,095,868 B2
(45) Date of Patent: Aug. 4, 2015

(54) GLUE DISPENSER

(71) Applicant: HON HAI PRECISION INDUSTRY CO., LTD., New Taipei (TW)

(72) Inventor: Chien-Chun Wang, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 212 days.

(21) Appl. No.: 13/873,250

(22) Filed: Apr. 30, 2013

(65) Prior Publication Data

US 2013/0343803 A1    Dec. 26, 2013

(30) Foreign Application Priority Data

Jun. 20, 2012  (TW) .............................. 101122020 A

(51) Int. Cl.
| | |
|---|---|
| B43K 8/06 | (2006.01) |
| B05C 1/00 | (2006.01) |
| B05C 1/02 | (2006.01) |
| G02B 7/02 | (2006.01) |

(52) U.S. Cl.
CPC . *B05C 1/00* (2013.01); *B05C 1/027* (2013.01); *G02B 7/025* (2013.01)

(58) Field of Classification Search
CPC ........... B05C 1/00; B05C 1/027; G02B 7/025
USPC .................. 401/196, 198; 427/162, 164, 165, 427/163.1, 163.3, 163.4; 359/819
See application file for complete search history.

(56) References Cited

U.S. PATENT DOCUMENTS

| | | | |
|---|---|---|---|
| 7,534,063 B2* | 5/2009 | Lin ............................... | 401/265 |
| 2014/0022657 A1* | 1/2014 | Lu et al. ........................ | 359/827 |

\* cited by examiner

*Primary Examiner* — Jennifer C Chiang
(74) *Attorney, Agent, or Firm* — Novak Druce Connolly Bove + Quigg LLP

(57) ABSTRACT

A glue dispenser comprises a container accommodating glue, a glue dispensing head and a glue dispensing ring. The glue dispensing head is connected with the container, the glue dispensing head is substantially cylindrical and includes a top surface and a bottom surface opposite to the top surface, the top surface is arranged inside the container, the bottom surface is exposed outside the container, the glue dispensing head has a plurality of through holes extending from the top surface towards the bottom surface to ensure the steady extrusion of glue in small quantities from multiple small outlets arranged in a circle.

12 Claims, 7 Drawing Sheets

GLUE DISPENSER

BACKGROUND

1. Technical Field

The present invention relates generally to glue dispensers.

2. Description of Related Art

Lens modules are widely employed in camera systems and mobile phones for image capturing. A lens module includes a lens barrel, at least one lens group, a spacer, and a filter (e.g., an IR filter). In assembly, the lens group, the spacer and the filter are received in the lens barrel and arranged along an optical axis thereof, and then, a glue dispenser including a needle for dispensing glue is provided. After that, glue is dispensed in drops from the needle between the lens group and the lens barrel to fix the lens group in the barrel, but the needle is small and is easily damaged during the process of dispensing.

Therefore, it is desired to provide a glue dispenser and a dispensing method which can overcome the above mentioned problems.

DETAILED DESCRIPTION

Figure 1:
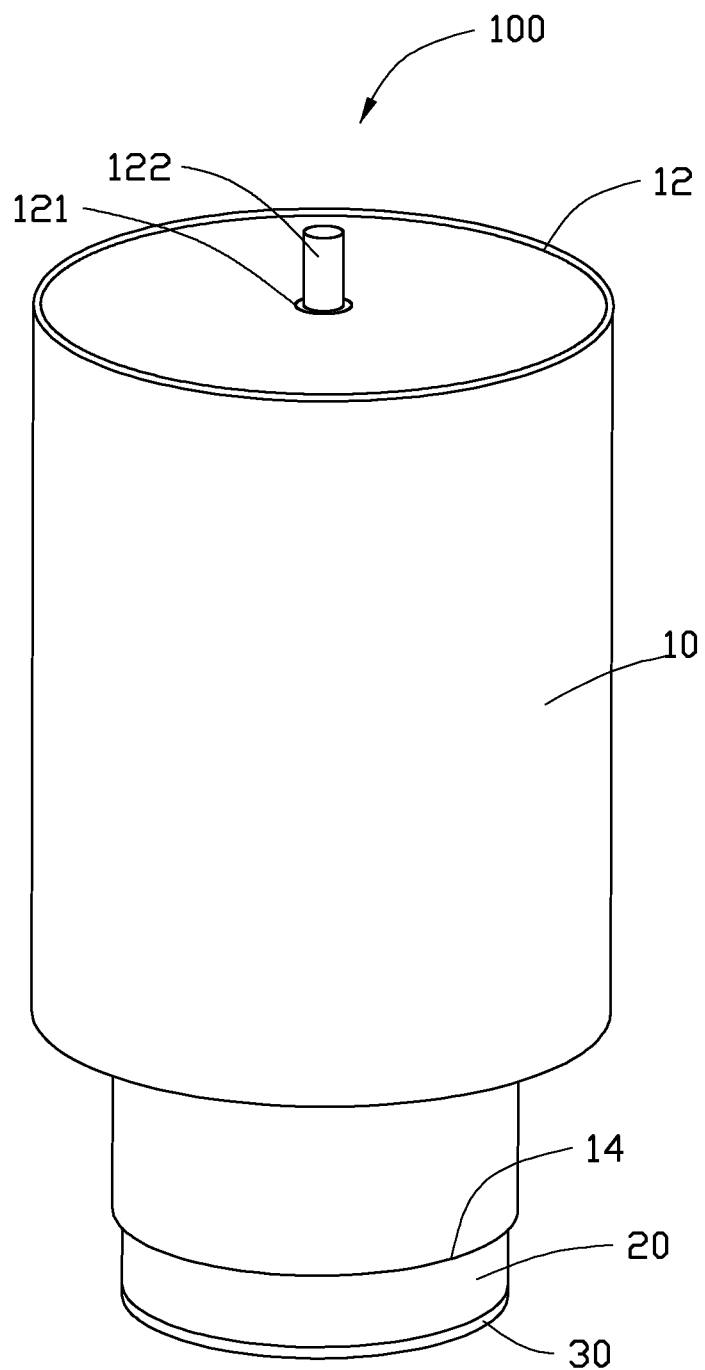
FIG. 1 is a schematic, isometric view of a glue dispenser according to a first embodiment, the glue dispenser including a glue dispensing head.
Figure 2:
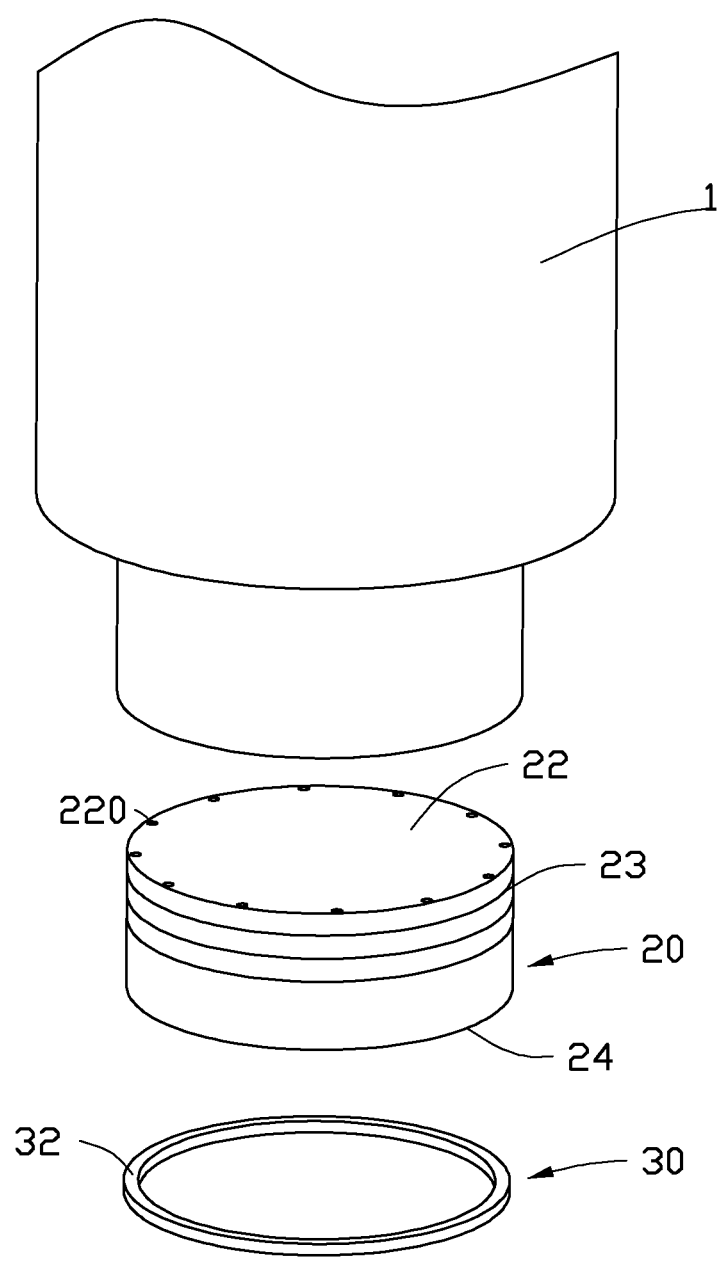
FIG. 2 is an exploded view of the glue dispenser of FIG. 1.

FIGS. 1-2 show a glue dispenser 100 according to a first embodiment. The glue dispenser 100 includes a container 10 accommodating glue, a glue dispensing head 20 and a glue dispensing ring 30. In the embodiment, the container 10 is substantially a hollow cylinder. The container 20 includes a first end 12 and a second end 14 opposite to the first end 12. The container 10 further defines a refilling hole 121 at the first end 12 for refilling the container 10 and comprises a sealing member 122 for sealing the refilling hole 121.

Figure 3:
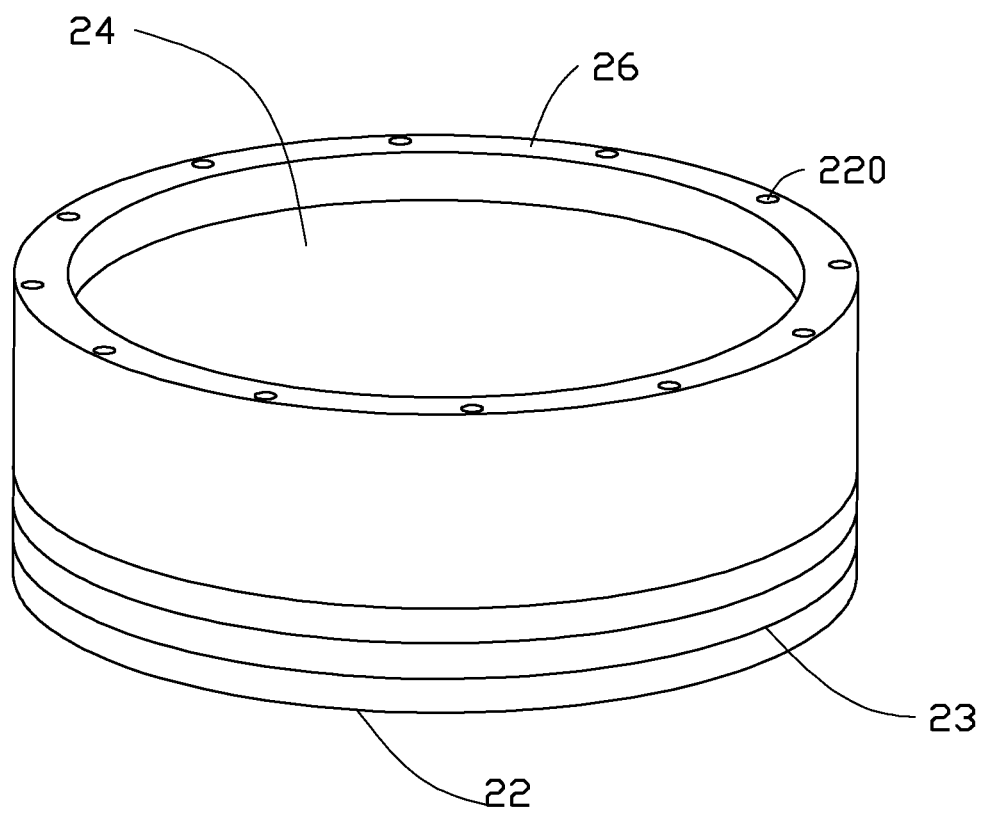
FIG. 3 is a schematic, isometric view of the glue dispensing head of FIG. 1.

Also referring to FIG. 3, the glue dispensing head 20 is substantially a cylinder and includes a top surface 22 and a bottom surface 24 opposite to the top surface 22. The glue dispensing head 20 is connected to the second end 14 of the container 10 via screw threads 23 arranged on the periphery of the glue dispensing head 20 in this embodiment. In this way, the connection between the glue dispensing head 20 and the container 10 is easy to assemble and disassemble. The glue dispensing head 20 can also be connected to the container 10 by crimping or adhesive, or the glue dispensing head 20 can be integrally formed with the container 10.

The top surface 22 is located inside the container 10. The bottom surface 24 is exposed outside the container 10. In the illustrated embodiment, the glue dispensing head 20 also includes an annular projection 26 extending from the circumference of the bottom surface 24 away from the top surface 22. The glue dispensing head 20 also defines a number of through holes 220 along the circumference of the top surface 22. The through holes 220 extend through the projection 26, the top surface 22 and the bottom surface 24. In particular, the through holes 220 are equidistantly distributed along the circumferential surface of the glue dispensing head 20.

The glue dispensing ring 30 is fixed on the annular projection 26 and covers the through holes 220. The glue dispensing ring 30 is fixed to the annular projection 26 via means such as adhesive bonding. A cross-sectional surface of the glue dispensing ring 30 along a radial direction thereof is square. A cross-section of the glue dispensing ring 30 can also be round or trapezoidal in other embodiments. The glue dispensing ring 30 is made of porous absorbing material such as porous sponge, porous cotton fiber or porous foam plastic. The glue dispensing ring 30 communicates with the container 10 via the through holes 220, thus the glue from the container 10 can flow along the through holes 220 to the glue dispensing ring 30, and the glue dispensing ring 30 can adsorb glue by capillary action and can dispense glue when proper pressure is applied to the glue dispensing ring 30.

Figure 4:
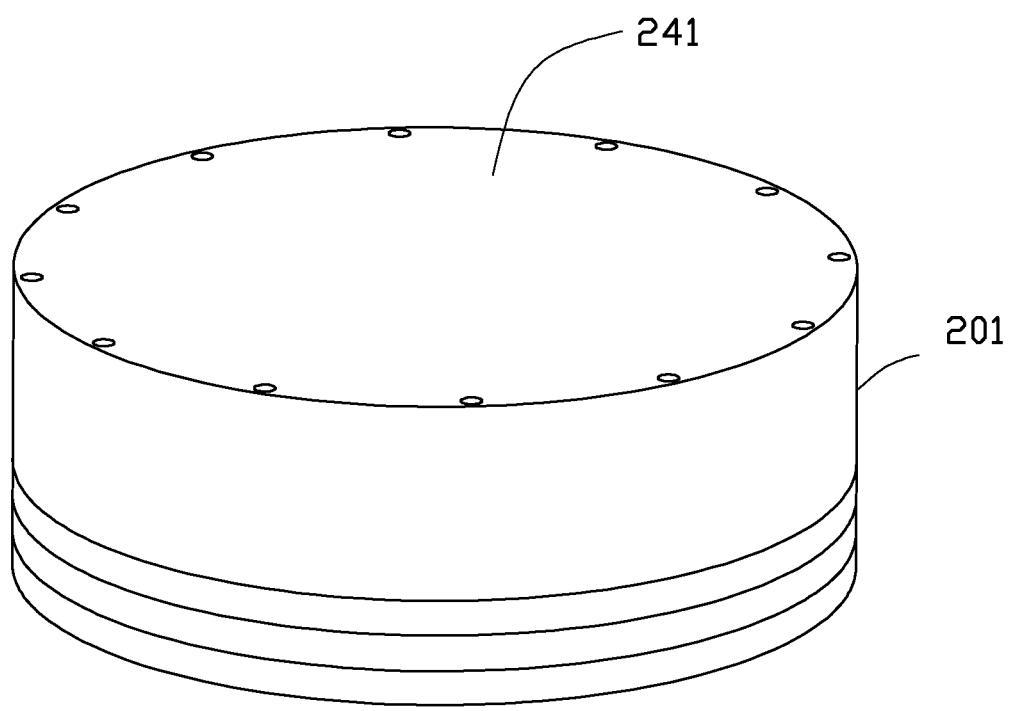
FIG. 4 is a schematic, isometric view of a glue dispensing head according to a second embodiment.

FIG. 4 shows a glue dispensing head 201 according to a second embodiment. The difference between the glue dispensing head 20 and the glue dispensing head 201 in the second embodiment is that the glue dispensing head 201 omits the annular projection on the bottom surface 241 and the glue dispensing ring 30 is directly arranged on the bottom surface 241.

Figure 5:
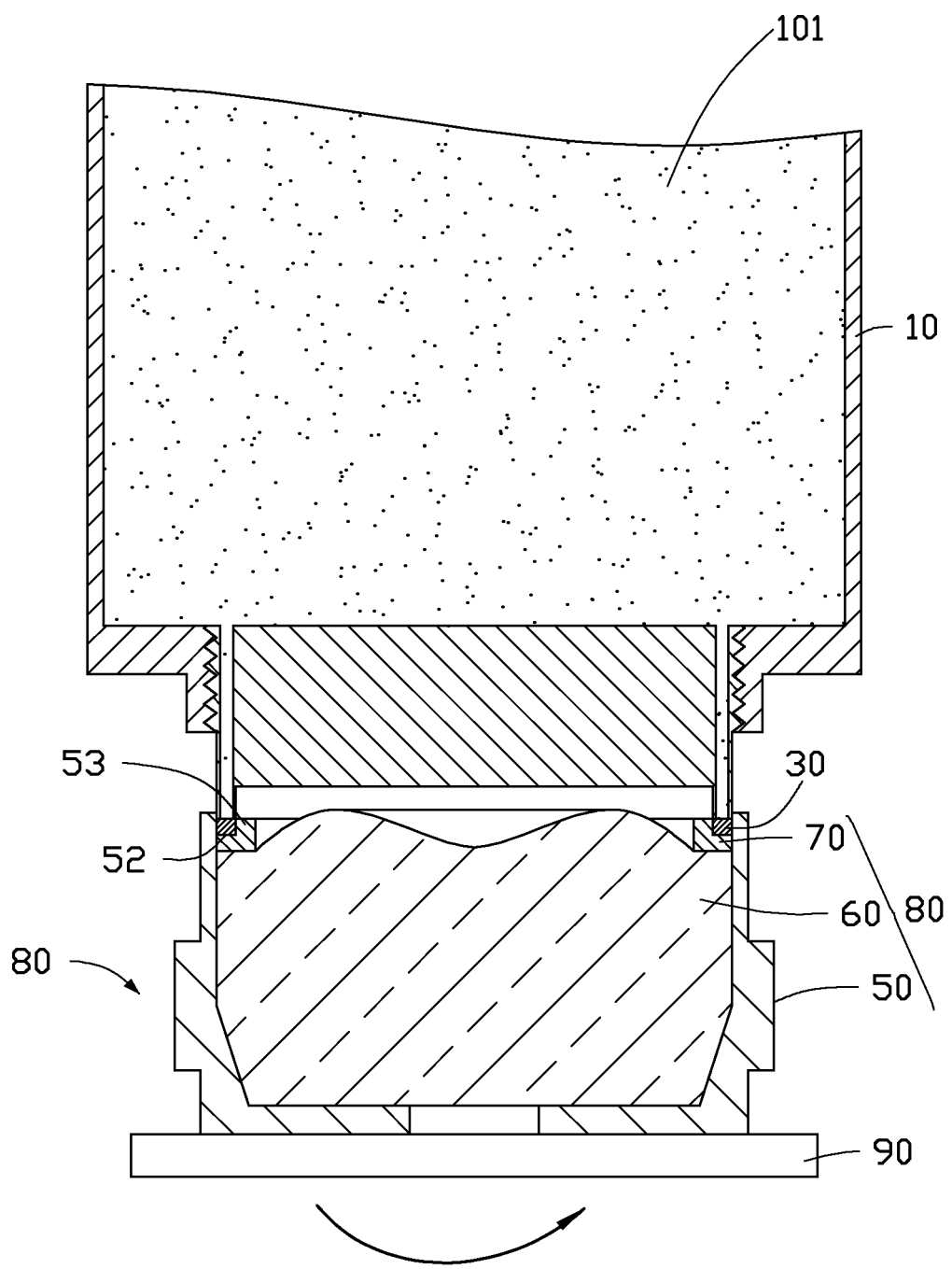
FIG. 5 is a schematic cross-sectional view showing a method for assembling a lens module by using the glue dispenser of FIG. 1 according to a third embodiment.
Figure 6:
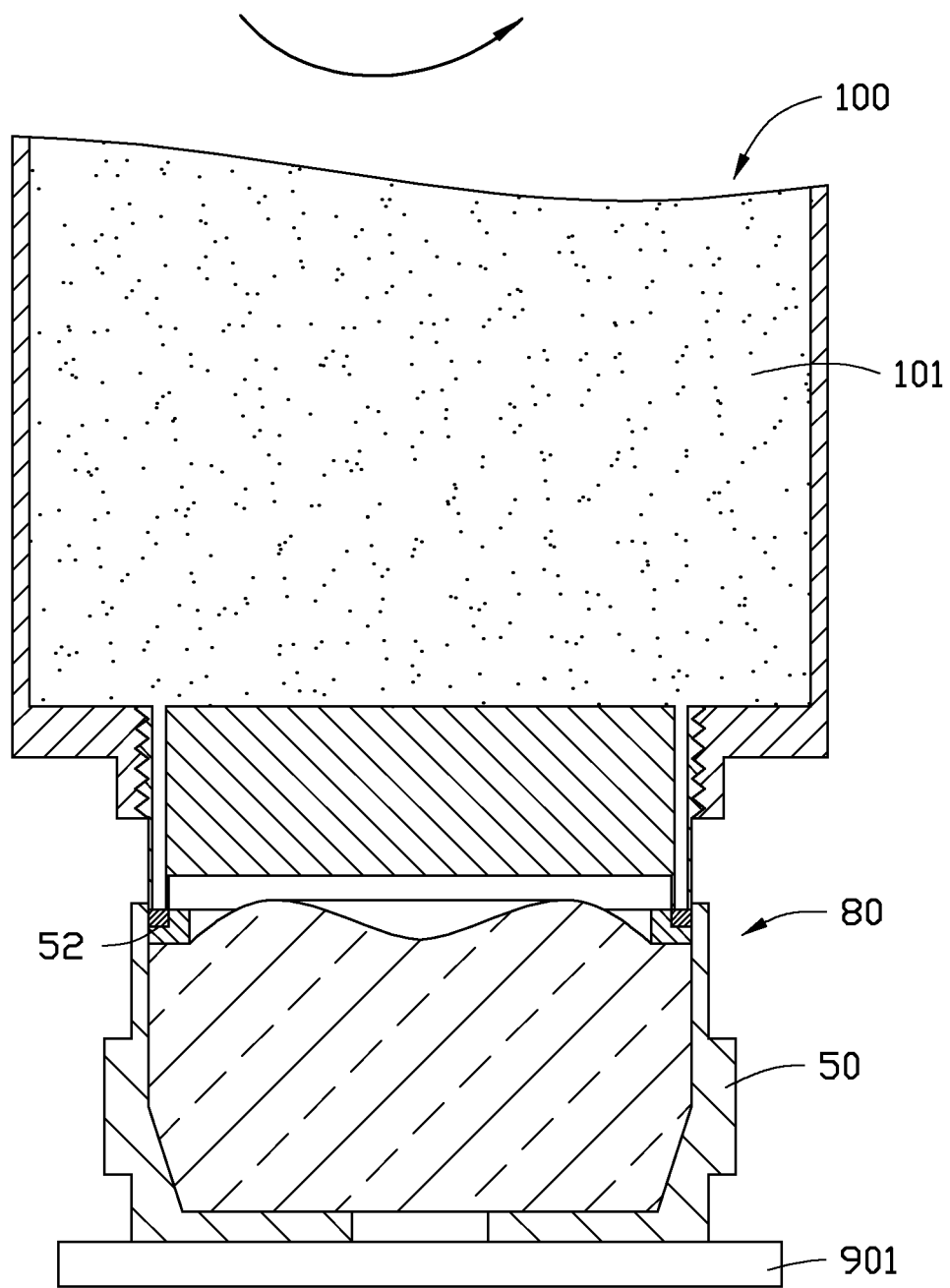
FIG. 6 is a cross-sectional view showing a method for assembling a lens module by using the glue dispenser of FIG. 1 according to a fourth embodiment.
Figure 7:
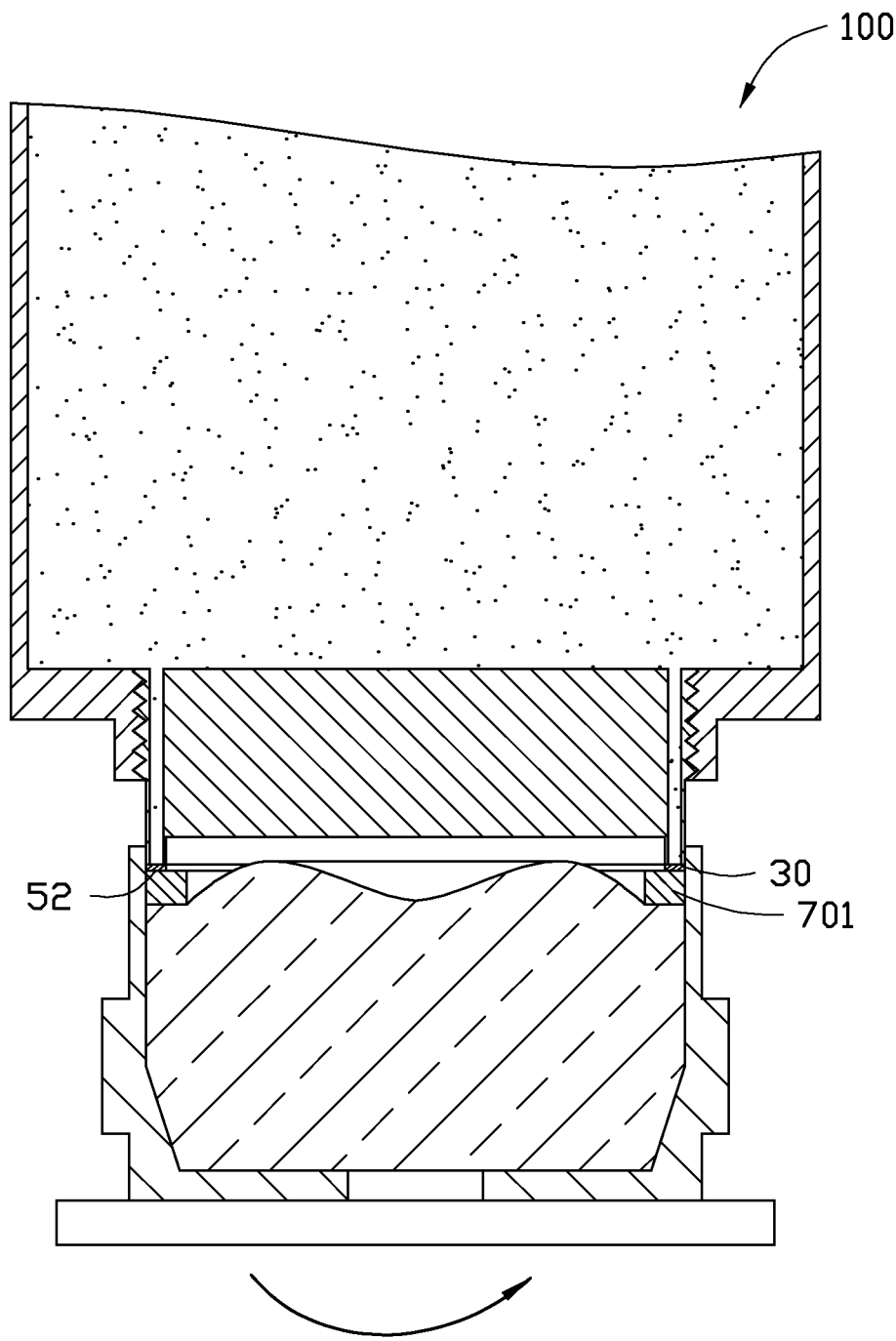
FIG. 7 is a cross-sectional view showing a method for assembling a lens module by using the glue dispenser of FIG. 1 according to a fifth embodiment.

Referring to FIGS. 5-7, a dispensing method using the glue dispenser 100 for assembling a lens module is described below.

FIG. 5 shows a dispensing method for assembling a lens module according to a third embodiment, which includes the following steps.

Step 1: a lens group 60, a spacing element 70 and a lens barrel 50 are provided, to result in a pre-glued lens module 80. The lens group 60 and the spacing element 70 are received in that order in the lens barrel 50 and arranged along an optical axis thereof pre-glue. The pre-glued lens module 80 includes a pre-bonded part 52. The pre-bonded part 52 is formed by the spacing element 70 and an inner sidewall of the lens barrel 50. The pre-bonded part 52 receives glue 101 flowing out from the glue dispensing ring 30. The spacing element 70 is a spacer ring, or a filter. In the embodiment, the spacing element 70 is a spacer ring with an annular protrusion 53 along a circumference thereof, and the pre-bonded part 52 is cooperatively formed by the inner wall of the lens barrel 50 and the annular protrusion 53 and a annular groove is cooperatively defined by the inner wall of the lens barrel 50 and the annular protrusion 53. The pre-glued lens module 80 is presented for gluing on a rotary carrier 90.

Step 2: a glue dispenser 100 is provided. The container 10 of the glue dispenser 100 contains glue 101.

Step 3: the glue dispenser 100 is moved toward the pre-glued lens module 80 until the glue dispensing ring 30 is positioned in and makes contact with the pre-bonded part 52. Then the glue dispenser 100 is fixed in place.

Step 4: the rotary carrier 90 rotates at a fixed rate with the pre-glued lens module 80. The glue 101 stored in the glue dispensing ring 30 flows to the pre-bonded part 52 due to pressure applied by the rotation of the pre-glued lens module 80. Such flow can occur continuously during such rotary movement or can occur at periodic intervals, depending on the gluing pattern desired.

Step 5: the glue dispenser 100 is moved away from the pre-bonded part 52 after the dispensing process is completed. The lens group 60 is thus firmly fixed with the lens barrel 50.

The above-described glue dispenser has good dispensing efficiency due to the glue dispensing head 20(201) and the glue dispensing ring 30 being used instead of a needle. Contact area of the ring 30 is larger than that of the needle. Therefore, it is more efficient to complete treat one lens module with glue and the ring 30, compared to the needle, is more immune to incidental damage.

FIG. 6 shows a method for assembling the lens module according to a fourth embodiment. The difference between the method shown in the FIG. 6 and the method shown in FIG. 5 is that the pre-glued lens module 80 remains stationary while the glue dispenser 100 is rotated at a fixed rate. The glue 101 stored in the glue dispensing ring 30 flows to the pre-bonded part 52 in the same way.

FIG. 7 shows a method for assembling the lens module according to a fifth embodiment. The difference between the method shown in FIG. 5 and the method shown in FIG. 7 is that the spacer element 701 in FIG. 7 is a ring-shaped sheet, and the glue dispenser 100 is placed in the pre-bonded part 52 and close to the inner wall of the lens barrel 50, subsequent steps in the dispensing method are substantially the same as in the third embodiment.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A glue dispenser comprising:
    a container configured for accommodating glue;
    a glue dispensing head connected with the container, the glue dispensing head comprising a top surface and a bottom surface opposite to the top surface, the top surface being arranged inside the container, the bottom surface being exposed outside the container, the glue dispensing head defining a plurality of through holes extending from the top surface towards the bottom surface; and
    a glue dispensing ring fixed on the bottom surface of the glue dispensing head and covering the through hole, the container communicating with the through holes.

2. The glue dispenser of claim 1, wherein the through holes are equidistantly distributed along the circumferential surface of the glue dispensing head.

3. The glue dispenser of claim 1, wherein the glue dispensing head is substantially a cylinder.

4. The glue dispenser of claim 1, wherein the glue dispensing head further comprises an annular projection formed on the bottom surface.

5. The glue dispenser of claim 4, wherein the through holes extend through the projection.

6. The glue dispenser of claim 1, wherein the glue dispensing head is threadedly engaged with the container.

7. The glue dispenser of claim 1, wherein a cross section of the glue dispensing ring is square, round or trapezoidal.

8. The glue dispenser of claim 1, wherein the glue dispensing ring is made of porous absorbing material.

9. The glue dispenser of claim 8, wherein the porous absorbing material is porous sponge.

10. The glue dispenser of claim 8, wherein the porous absorbing material is porous cotton fiber.

11. The glue dispenser of claim 8, wherein the porous absorbing material is porous foam plastic.

12. The glue dispenser of claim 1, wherein the container further comprises a refilling hole for refilling glue into the container and a sealing member for sealing the refilling hole.

\* \* \* \* \*